US 6,595,882 B2

(12) United States Patent
Bubel et al.

(10) Patent No.: US 6,595,882 B2
(45) Date of Patent: Jul. 22, 2003

(54) POWER TRANSMISSION CHAIN HAVING LINKS WITH LATERAL SPACING ELEMENTS

(75) Inventors: Dennis J. Bubel, Groton, NY (US); Mark E. Michaels, Homer, NY (US); Mark A. Giovannini, Senaca Falls, NY (US); Roger P. Butterfield, Trumansburg, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/132,485

(22) Filed: Apr. 25, 2002

(65) Prior Publication Data
US 2002/0128102 A1 Sep. 12, 2002

Related U.S. Application Data

(62) Division of application No. 09/506,349, filed on Feb. 17, 2000, now Pat. No. 6,406,394.
(60) Provisional application No. 60/131,413, filed on Apr. 28, 1999.

(51) Int. Cl.⁷ .......................... F16G 13/04; F16G 13/02
(52) U.S. Cl. ....................................... 474/212; 474/231
(58) Field of Search ................................ 474/212–218, 474/221, 231

(56) References Cited

U.S. PATENT DOCUMENTS

| 1,115,431 | A | * | 10/1914 | Howson ..................... 474/213 |
| 3,659,112 | A | * | 4/1972 | Stedman ................. 474/218 X |
| 4,345,904 | A | | 8/1982 | Numazawa et al. |
| 4,580,999 | A | | 4/1986 | Ledford |
| 4,758,209 | A | | 7/1988 | Ledvina |
| 4,911,682 | A | | 3/1990 | Ivey et al. |
| 4,943,266 | A | | 7/1990 | Mott |
| 5,192,252 | A | | 3/1993 | Skurka et al. |
| 5,318,485 | A | | 6/1994 | Bateman |
| 5,345,753 | A | | 9/1994 | Okuda et al. |
| 5,372,554 | A | | 12/1994 | Okuda |
| 5,435,789 | A | | 7/1995 | Avramidis et al. |
| 5,439,423 | A | | 8/1995 | Okuwaki et al. |
| 5,445,570 | A | | 8/1995 | White |
| 5,645,503 | A | | 7/1997 | Okuda et al. |
| 5,651,746 | A | | 7/1997 | Okuda |
| 6,068,568 | A | * | 5/2000 | Kozakura et al. ........... 474/212 |

* cited by examiner

Primary Examiner—Charles A Marmor
Assistant Examiner—Roger Pang
(74) Attorney, Agent, or Firm—Greg Dziegielewski; Fitch, Even, Tabin & Flannery

(57) ABSTRACT

A power transmission chain having a plurality of inside links and guide links. Each inside link has at least one inverted tooth adapted to contact the teeth of an associated sprocket. Each link has a pair of apertures which are connected by connecting pins inserted through the apertures. The chain is provided with projections acting to maintain a spaced relationship between the guide links and the inside links. The spacing of the guide link away from the inside links is accomplished by spacing elements which may include projections formed on the guide link or an outer face of the outermost inside link, or by washers or spacers interposed therebetween.

4 Claims, 4 Drawing Sheets

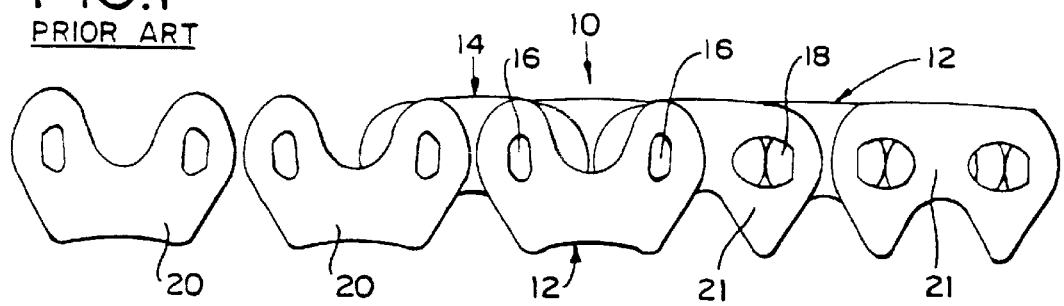
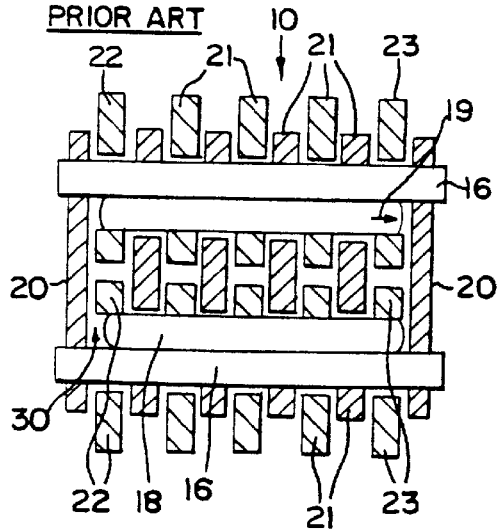
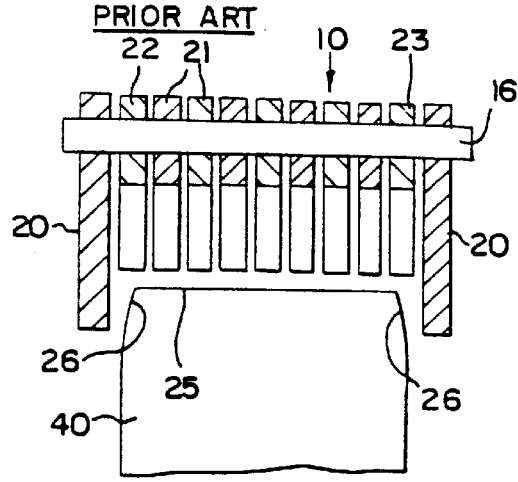
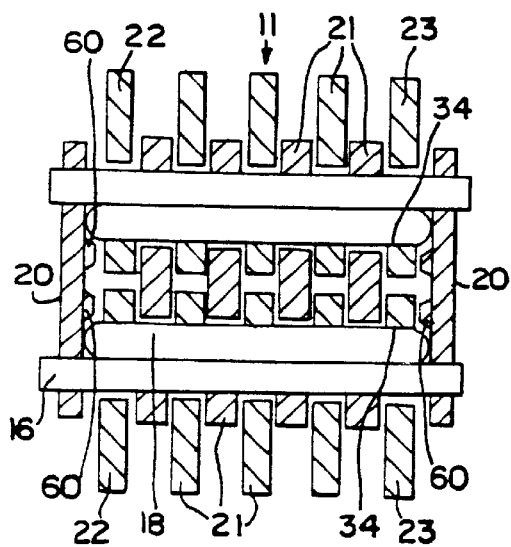
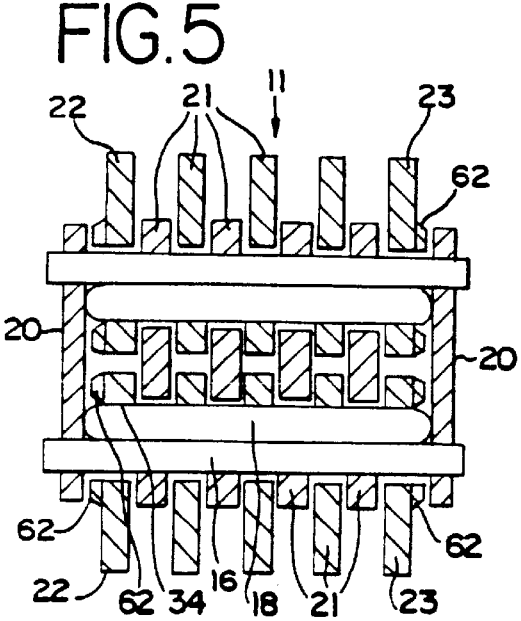

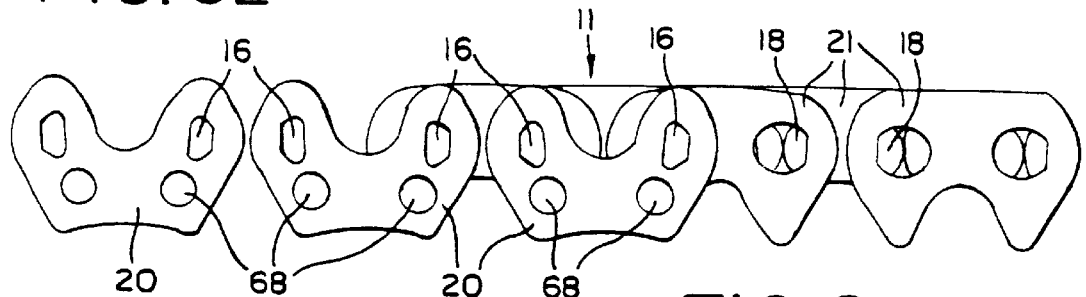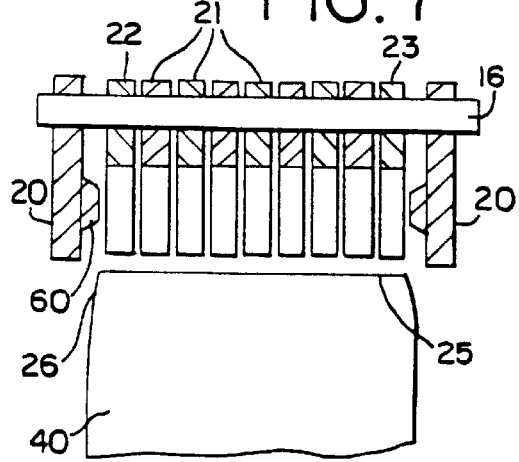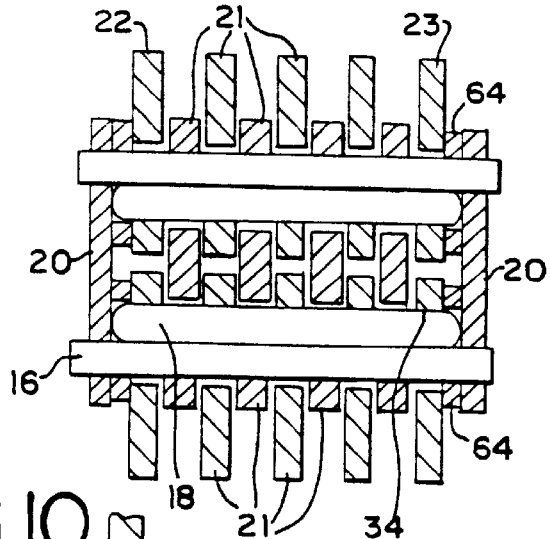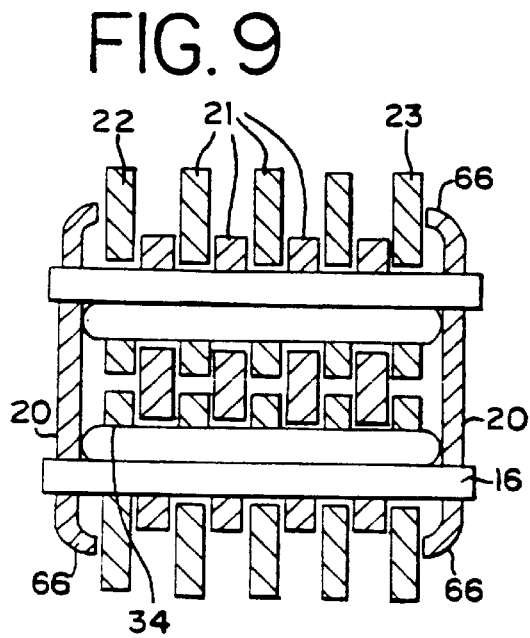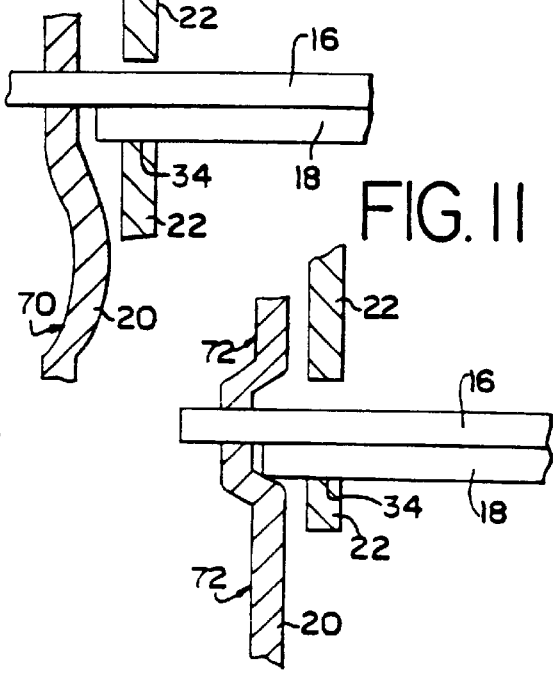

POWER TRANSMISSION CHAIN HAVING LINKS WITH LATERAL SPACING ELEMENTS

This application is a division of 09/506,349, filed Feb. 17, 2000, now U.S. Pat. No. 6,406,394, and claims benefit of provisional application U.S. Ser. No. 60/131,413, filed Apr. 28, 1999.

BACKGROUND OF THE INVENTION

The present invention relates to a power transmission chain having link plates which have protrusions or projections for maintaining a space between the guide link and the inside links.

One aspect of the invention relates to a silent or rocker joint chain which has links having inverted teeth for engagement with an associated sprocket. Generally, rocker joint chains are used with sprockets for power transmission in transmissions, transfer cases, engine timing systems, and the like. Rocker joint chains are well known in the art. Examples include U.S. Pat. Nos. 5,651,746; 5,345,753; and 5,372,554 which are incorporated herein by reference.

Rocker joint chains are formed by the assembly of rows of links in lateral and longitudinal directions. Each link typically has a pair of teeth and a pair of pin apertures. The links are interlaced and then connected to each other by connecting pins inserted in each pin aperture. Guide links are utilized as the outermost links of the chain to maintain the chain on the sprockets when the chain is wrapped around the sprockets during operation. Guide links may be installed in the center or at both outer edges of the row of link plates arranged in the lateral direction. The guide links are conventionally press fit over pins, which connect the interlaced inside or articulating links. Guide links typically do not include inverted teeth.

Conventionally, a rocker joint is used as the connecting pin. The rocker joint is comprised of a pair of long and short pins. A first short pin, referred to as the rocker, is paired with a second longer pin. The longer pin has both ends fixed to guide links at the outmost flanks of the chain.

Conventional rocker joint chains are limited in the transfer of load between the rocker and the inside links that are positioned at the outermost end of the rocker. The limitation is due to the fact that only partial contact is obtained between these same inside links and the end of the rocker. A separate limitation concerns the contact between the outermost inside links and the sprocket. Due to the required chamfer on sprocket teeth and the axial clearance between the sprocket teeth and chain guide links only partial contact is achieved between the same inside links and the sprocket.

A prior art rocker joint chain showing the disadvantage in conventional chain designs is shown in FIGS. 1–3. The chain is comprised of rows of links. Alternate rows of links, or guide rows, have guide links press fit on their ends. The remaining rows, or non-guide rows have inside links as their outermost links.

FIG. 1 shows a prior art rocker joint chain in a side view. Rows of inner links 21 in a guide row 12 alternately interleave with rows of inner links 21 in a non-guide row 14 and held by rocker joints comprising pairs of pins 16 and rockers 18. A guide link 20 is fixed to the each end of the guide row 12 of inner links 21 by pins 16 which extend outwardly from the rows of inside links.

In the prior art rocker joint chain 10, shown in FIG. 2, there is a clearance 30 between the end of the rocker 18 and the guide link 20. This clearance 30 exists because of necessary manufacturing tolerances of the individual rockers 18 so that they are spaced from the guide links 20 after the assembly process. There also exists an end radius 19 on the rocker 18, which is necessary to prevent excessive local stresses in the pin 16 and rocker 18, and also for ease of assembly of the chain 10. The clearance between the rocker 18 and the guide link 20 and the shortening of the rocker as a result of the end radius of the rocker, result in only partial bearing contact between the outermost inside links 22, 23 of the non-guide row, and the rocker. The partial bearing contact limits the load carrying capability of the chain because all of the links are not carrying their full share of the load.

FIG. 3 shows an exaggerated cross section through the chain of the prior art and sprocket 40. The chain 10 is shown slightly out of position, i.e., raised vertically. The limitation in this design is that the contact area between the outermost inside links 22, 23 and sprocket tooth 25 is limited due to the chamfer 26 on the sprocket teeth and the necessary axial clearance between the chain 10 and sprocket 40. Thus, the partial engagement or partial contact occurs between the outermost inside links 22, 23 of the non-guide row and the sprocket.

The present invention also has application to silent chains with round connecting pins. An example of a round pin silent chain is shown in U.S. Pat. No. 4,758,209, which is incorporated herein by reference.

The present invention also has application to chain belts, as shown in U.S. Pat. Nos. 4,580,999 and 5,439,423 which are incorporated herein by reference.

SUMMARY OF THE INVENTION

The present invention addresses the above-described problems by providing in a power transmission chain, in general terms, a spacing element to space the guide links apart from the inside links. In one embodiment, this allows for increased rocker length and provides improved inside link-to-rocker contact. Also, the present invention allows increased sprocket width providing better contact between the chain and sprocket.

The present invention is applied to a power transmission chain having a plurality of interleaved link rows arranged into non-guide rows and guide rows. Each link plate includes a pair of apertures. The links are connected by pins inserted through the apertures. The chain is provided with a plurality of spacing elements which include, but are not limited to protrusions, washers, spacers, bumps, curved portions or elements, raised elements, or stops for spacing the guide links apart from the inside links. The spacing elements may be integral to links of the chain or may be separate elements.

In a preferred embodiment, the power transmission chain of the present invention includes guide links with spacing elements located on an inner surface of each guide link plate for maintaining a space between the main body of the guide link and the inside links. The spacing element is a projection and may be formed, for example, by pressing or stamping a recess or dimple on the outside of the guide link causing a corresponding raised element or rounded projection to form on the inside surface of the guide link. The raised element or projection on the guide link bears upon an outside surface of the adjacent inside link and maintains a space between the main body of the guide link and the inside link.

The guide link of one embodiment of the present invention as applied to a rocker chain has projections formed on an inner face of the guide link which act to space the guide link away from the adjacent inside links. Spacing the guide link from the inside links permits a longer rocker that is fully within the outermost inside link and provides complete bearing contact between the rocker and the inside links, specifically the outermost inside links. The stress in the rocker is reduced by virtue of a slight increase in rocker length, and by keeping the inside link load away from the end of the rocker, reducing stress concentrations.

Another aspect of the present invention relates to silent chains which use a round cylindrical pin to connect link rows. The benefit of spacing members to a round pin silent chain is directed to the increase in contact area between the inside links and an associated sprocket.

Still another aspect of the present invention is related to chain type belts. The benefit of spacing members to a chain type belt is directed to the increase in contact area between the rocker pin and the outermost inside link aperture.

It should be understood that the number of projections provided each guide link includes one projection to many projections. In one preferred embodiment, four rounded projections are located on the inside face of each guide link. One pair of projections are spaced apart near the bottom edge of the guide link and the remaining pair are spaced apart near the top edge of the guide link. The spaced relationship of the four projections reduces the tendency of the adjacent inside link to rock or tilt.

In another embodiment, the present invention includes guide links which are spaced apart from the inside links by washers. The washers are located about the connecting pins between the guide links and the inside links and serve to space the guide links from the inside links.

In another embodiment, the present invention includes guide links with curved elements formed on the ends of the guide link which curve inwardly toward and bear upon the inside links. The curved end elements give the guide link a "C" or "U" shape as viewed from above as opposed to the typical flat plate form of the prior art.

In another embodiment, the present invention includes guide links with curved spacing elements formed in the middle portion of the link. The curved mid-elements or portions cause the guide link to exhibit a non-flat shape and acts to maintain a space between the guide links and the inside links.

For a better understanding of these and other aspects and objects of the invention, reference should be made to the following detailed description taken in conjunction with the accompanying drawings.

BRIEF DESCRIPTION OF THE DRAWINGS

FIG. 1 is a longitudinal side view of a portion of a prior art rocker joint chain.

FIG. 2 is a sectional view of a portion of a prior art rocker joint chain.

FIG. 3 is a sectional end view illustrating the spacing between the sprocket and guide links in a prior art rocker joint chain.

FIG. 4 is a sectional view of the power transmission chain of the present invention showing the projections from the guide links.

FIG. 5 is a sectional view of the power transmission of the present invention showing an alternate location of the projections.

FIG. 6E is a longitudinal side view of a portion of a power transmission chain of the present invention showing the guide link side opposite the projections.

FIG. 7 is a sectional end view showing the projections.

FIG. 8 is a sectional view showing the location of the washers.

FIG. 9 is a sectional view showing the curved end elements of the guide links.

FIG. 10 is a partial sectional view showing an embodiment of the curved mid-elements of the guide links.

FIG. 11 is another embodiment of the curved mid-elements.

DESCRIPTION OF THE PREFERRED EMBODIMENTS

Figure 6A:
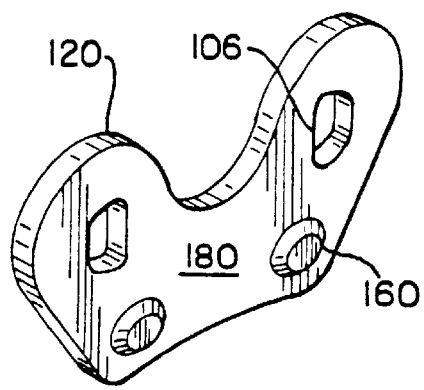
FIG. 6A is a perspective view of the inside face of the guide link with two projections.

The present invention is explained below with reference to the embodiments illustrated by the attached figures.

FIG. 4 shows a sectional view of the preferred embodiment of a rocker joint chain 111 of the present invention. As in the prior art, the chain is constructed from the assembly of interleaved rows of links. Inside links 121 are flanked by guide links 120 and connected by connecting pins each comprising a pin 116 and a rocker 118. The guide links 120 and inside links 121 are shown more clearly in FIG. 6E. The inside links shown in FIG. 6E are shown as each having a pair of depending teeth adapted to contact the teeth of an associated sprocket (not shown). It should be understood that other configurations of inner links are contemplated, such as links with a single depending tooth as disclosed in U.S. Pat. No. 5,435,789, incorporated herein by reference.

In the chain of the present invention, the guide links maintain the lateral alignment of the chain on the sprockets. The guide links 120 are located along the outside of the chain, i.e., flanking the outermost inside links 122, 123 and do not have teeth for engagement with the sprocket teeth. The guide link 120 has projections 160 formed on an inner face. The projections 160 bear upon outermost inside links 122, 123 and act to maintain a space between the main body of the guide links 120 and the inside links 122, 121, 123. Complete bearing contact between the rocker 118 and the outermost inside links 122, 123 at surface 134 is provided by virtue of the slight increase in rocker length allowed by the increased space between the guide links 120 and the outermost inside links 122, 123.

An alternate embodiment of the present invention shown in FIG. 4 is illustrated in FIG. 5. Projections 162 are formed on the outside face of the outermost inside links 122, 123. Each projection 162 serves the same function as projection 160 in FIG. 4, i.e., which is to space apart the inside links 121, 122, 123 from the guide links 120 to provide increased axial clearance. While operating like the embodiment shown in FIG. 4, the present embodiment requires the manufacture of three different link types as opposed to two.

Figure 6B:
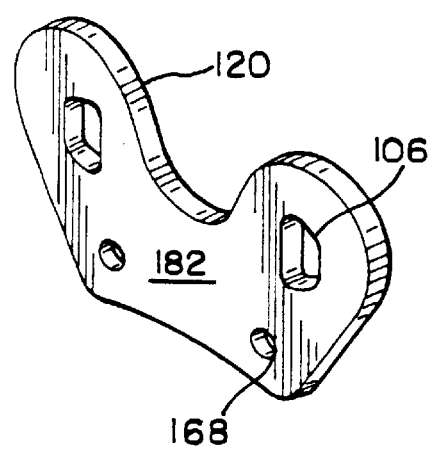
FIG. 6B is a perspective view of the outside face of the guide link with two projections.

FIGS. 6A and 6B show an inside and outside view respectively of one embodiment of a guide link of the present invention. Guide link 120 has a pair of projections 160 on an inside surface 180 of the link plate. The projections 160 are located below the guide link plate apertures 106. The corresponding recesses or locations 168 are shown on the outside surface 182 of the guide link 120.

Figure 6C:
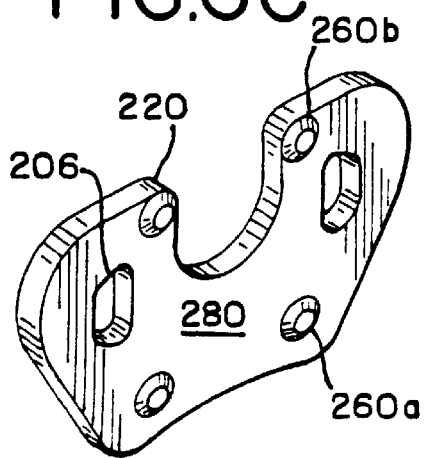
FIG. 6C is a perspective view of the inside face of the guide link with four projections.
Figure 6D:
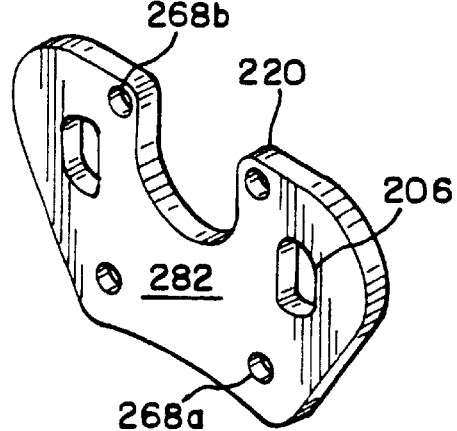
FIG. 6D is a perspective view of the outside face of the guide link with four projections.

FIGS. 6C and 6D show an inside and outside view respectively of another embodiment of a guide link of the present invention. Guide link 220 has two pair of projections 260a, 260b on an inside surface 280 of the link plate. The projections 260a are located below the guide link plate apertures 206, and the projections 260b are located above the guide link plate apertures 206. Note that the top of the guide link has been widened above each aperture to allow space for both the aperture and the projection. The corresponding recesses or locations 268a, 268b are shown on the outside. surface 282 of the guide link 220.

FIG. 6E shows one embodiment of the location 168 of the projections 160 formed into the guide links 120 shown in FIG. 4 and FIGS. 6A and 6B. However, the projections 160 can be located in any portion of the guide link which allows contact with the outermost inside links 122, 123 and provides the desired axial spacing. The projections 160 can be formed by various methods including pressing, stamping, molding, machining or the like. Location 168 may also correspond to a recess or dimple formed on the outer face of the guide link 120 when creating the projections on the inner face of the guide link 120 by a stamping process.

FIG. 7 shows a preferred embodiment of the chain and sprocket in cross section. Projections 160 are shown on guide links 120 which bear upon outermost inside links 122, 123. With the additional axial space created by the projections 160, the sprocket width can be increased to assure full contact with all the inside links 121 including the outermost inside links 122, 123. The additional contact will reduce wear and contact stress between the chain and sprockets, which may in turn allow substitution of lower cost materials or processes for the sprocket, reducing overall system cost.

FIG. 8 illustrates another embodiment of the present invention. A washer 164 encircles the rocker joint between the guide links 120 and the inside links 121. The rocker 118 and the outermost inside links 122, 123 are in full contact at surface 134 due to the increased length of the rocker 118 allowed by increased clearance in the axial direction. The washer 164 need not be integral with the guide links or the inside links.

In FIG. 9 guide links 120 have curved end elements or portions 166 located at each of the distal ends of the guide link 120. Each curved end portion 166 extends inwardly toward the adjacent outermost inside link. The desired axial spacing is maintained by the curved end portions 166 bearing upon the outer face of the outermost inside links 122, 123.

FIGS. 10 and 11 illustrate in a simplified partial view alternate embodiments of the curved end portions 166 of FIG. 9. Curved mid-portions 170, 172 are portions of the guide link 120 which deviate from the typical flat plate-like guide link shape of the prior art. The curved mid-portions 170, 172 are located in the midsection of the guide link 120 and serve to maintain a space between the guide link 120 and an adjacent outmost inside link 122. An identical curved guide link 120 with a curved mid-portion 170 or 172 would be placed on the opposite side of the chain.

The spacing thus provided between the guide link and the inside links allows the rocker to contact against the entire bearing surface of the aperture of the outermost inside link. In addition, the spacing provides complete engagement of all the inside links with the entire width of the sprocket. Minimizing the clearance between the rocker and guide link serves to lessen the amount of rocker movement and helps to maintain the stated advantages.

Figure 12:
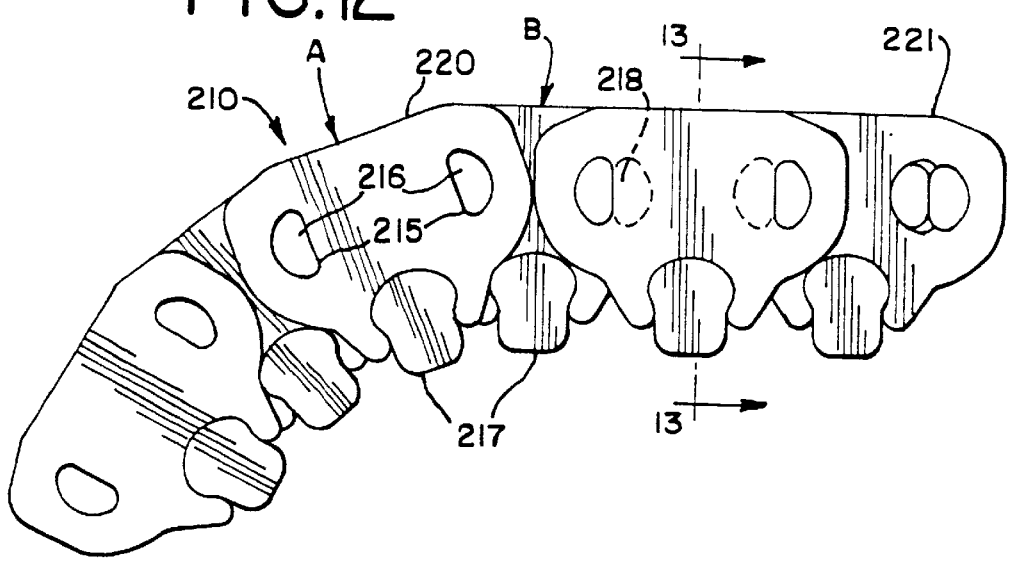
FIG. 12 is a side view of a chain belt.
Figure 13:
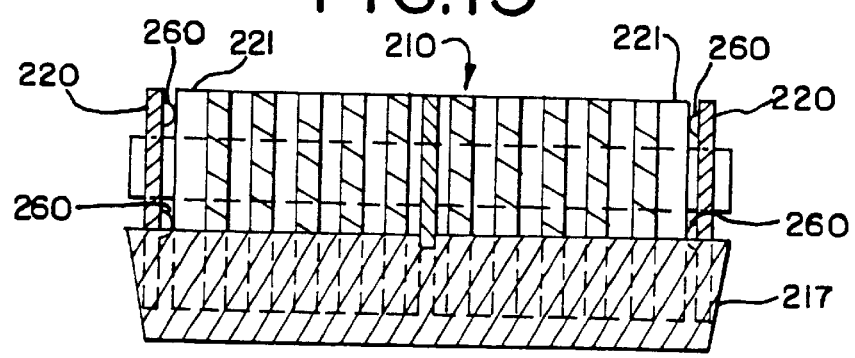
FIG. 13 is a sectional view of the chain belt of FIG. 12 with spacing elements.

FIGS. 12 and 13 illustrate a power transmission chain belt 210 Generally, as shown in FIG. 12, the chain belt includes links arranged in sets A and B which are interleaved or "laced" with one another. A "set" of links are those links which are grouped transversely together; at times a set of links is referred to as a "rank." Each link is provided with a pair of apertures 215, each aperture being adjacent to an end of the link plate, with the apertures in a set being aligned with one another. When interlaced with other sets of links, the apertures 215 at one end are transversely aligned with those in the interleaved set, so that the connecting pin interconnects the interlaced links. The connecting pin typically includes a rocker 218 and a pin member 216. The pin member 216 extends through and is press fit to the apertures of the outermost link plates 220 which are located on the flanks of alternate sets of links. The rocker 218 extends through the apertures of the remaining links, at times referred to as the inside links 221, stopping short of the outermost or guide links 220. Struts 217 for engaging a pulley transmission (not shown) are provided to the chain either positioned in a passageway defined by toes which depending from each link or wrapped around the chain. Load blocks (not shown) may be wrapped about the chain to engage a pulley transmission.

As shown in FIG. 13, spacing elements or members 260 are applied to inside faces of the guide links 220. The benefit of spacing elements as applied to a chain type belt is directed to the increase in contact area between the rocker pin and the outermost inside link aperture.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A power transmission chain comprising:
   a plurality of interleaved inside links, each of said inside links having a pair of apertures, said inside links being interleaved and connected in a series of rows,
   a plurality of guide links, each of said guide links having a pair of apertures, said guide links being placed on the outside of alternate rows of said interleaved inside links to form guide rows,
   connecting pins received in said apertures, said connecting pins extending across said rows of said chain and having ends secured within said apertures of said guide links thereby connecting said inside links and said guide links, and
   at least a pair of spacing members integral with each said guide link beneath said apertures projecting toward an adjacent outermost inside link, said spacing members acting to maintain a spaced relationship between each said guide link and said adjacent outermost inside link without holding the inside links in compressive frictional contact therebetween.

2. The power transmission chain of claim 1, wherein two pairs of members are formed on an inside surface of each said guide link, one pair of said members being located beneath said apertures and the remaining pair of said members being located above said apertures.

3. A power transmission chain comprising:

a plurality of interleaved inside links, each of said inside links having a pair of apertures and at least one depending tooth adapted to contact the teeth of an associated sprocket, said inside links being interleaved and connected in a series of rows, a plurality of guide links, each of said guide links having a pair of apertures, said guide links being placed on the outside of alternate rows of said interleaved inside links to form guide rows, connecting pins comprising a rocker member and a pin member received in said apertures, said pin members extending across said rows of said chain and having ends press fit within apertures in said guide links, said rocker members extending across said rows of said chain and rotating against said pin members, said connecting pins connecting said inside links and said guide links, and said guide links having a pair of integral spacing members integral projecting inwardly toward said interleaved inside links, said spacing members acting to maintain a spaced relationship between said guide links and said outermost inner links in said guide rows effective to urge said outermost inner links in greater contact with said sprocket teeth without holding said inside links in compressive frictional contact therebetween.

4. The power transmission chain of claim 3, wherein two pairs of members are formed on an inside surface of each said guide link, one pair of said members being located beneath said apertures and the remaining pair of said members being located above said apertures.

\* \* \* \* \*